US007266369B2

(12) United States Patent
Moles et al.

(10) Patent No.: US 7,266,369 B2
(45) Date of Patent: Sep. 4, 2007

(54) SYSTEM AND METHOD FOR PROVISIONING OR UPDATING A MOBILE STATION USING OVER-THE-AIR TRANSFER OF INTERPRETED BYTE-CODE PROGRAM

(75) Inventors: Bryan J. Moles, Dallas, TX (US); Sudhindra P. Herle, Plano, TX (US); Ronald J. Webb, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 09/542,632

(22) Filed: Apr. 4, 2000

(65) Prior Publication Data

US 2003/0162533 A1 Aug. 28, 2003

(51) Int. Cl.
*H04M 3/00* (2006.01)

(52) U.S. Cl. ............... 455/418; 455/419; 455/420; 455/414.1

(58) Field of Classification Search ............... 455/418, 455/419, 420, 550, 414, 412, 414.1–414.4, 455/550.1
See application file for complete search history.

(56) References Cited

U.S. PATENT DOCUMENTS

| | | | | |
|---|---|---|---|---|
| 5,819,177 | A * | 10/1998 | Vucetic et al. | 455/425 |
| 6,144,849 | A * | 11/2000 | Nodoushani et al. | 455/419 |
| 6,223,028 | B1 * | 4/2001 | Chang et al. | 455/419 |
| 6,243,572 | B1 * | 6/2001 | Chow et al. | 455/408 |
| 6,314,282 | B1 * | 11/2001 | Weber et al. | 455/404 |
| 6,421,727 | B1 * | 7/2002 | Reifer et al. | 709/225 |
| 6,466,779 | B1 * | 10/2002 | Moles et al. | 455/410 |
| 6,587,684 | B1 * | 7/2003 | Hsu et al. | 455/419 |
| 6,622,017 | B1 * | 9/2003 | Hoffman | 455/419 |

* cited by examiner

*Primary Examiner*—Matthew Anderson
*Assistant Examiner*—Eugene Yun (57) ABSTRACT

There is disclosed a service provisioning system for use in a wireless network containing a group of base stations that communicate with mobile stations. The service provisioning system comprises: 1) a database for storing a service provisioning file comprising a mobile station service provisioning program in interpreted byte-code format; and 2) a provisioning controller coupled to the database that receives a notification indicating that a first mobile station is unprovisioned and, in response thereto retrieves the service provisioning file from the database and transmits the service provisioning file to the first mobile station. Receipt of the service provisioning file causes the mobile station to execute the mobile station service provisioning program in the service provisioning file. There also is disclosed a mobile station capable of being provisioned from a wireless network by an over-the-air (OTA) service provisioning process. The mobile station comprises 1) an RF transceiver that receives and demodulates forward channel messages from the wireless network and modulates and transmits reverse channel messages to the wireless network; and 2) a main controller that receives the demodulated forward channel messages from the RF transceiver and extracts therefrom a service provisioning file containing a mobile station service provisioning program in interpreted byte-code format. The main controller, in response to receipt of the service provisioning file, interprets and executes the interpreted byte-code application program.

20 Claims, 5 Drawing Sheets

SYSTEM AND METHOD FOR PROVISIONING OR UPDATING A MOBILE STATION USING OVER-THE-AIR TRANSFER OF INTERPRETED BYTE-CODE PROGRAM

CROSS-REFERENCE TO RELATED APPLICATIONS

The present invention is related to those disclosed in the following United States Patent Applications:

1. Ser. No. 09/500,499, filed Feb. 9, 2000, entitled "SYSTEM AND METHOD FOR SECURE OVER-THE-AIR PROVISIONING OF A MOBILE STATION FROM A PROVISIONING SERVER VIA A TRAFFIC CHANNEL;"

2. Ser. No. 09/501,468, filed Feb. 9, 2000, entitled "SYSTEM AND METHOD FOR SECURE PROVISIONING OF A MOBILE STATION FROM A PROVISIONING SERVER USING IWF-BASED IP ADDRESS TRANSLATION;"

3. Ser. No. 09/475,602, filed on Dec. 30, 1999, entitled "SYSTEM AND METHOD FOR SECURE PROVISIONING OF A MOBILE STATION FROM A PROVISIONING SERVER USING IP ADDRESS TRANSLATION AT THE BTS/BSC;" and 4. Ser. No. 09/475,760, filed on Dec. 30, 1999, entitled "SYSTEM AND METHOD FOR SECURE PROVISIONING OF A MOBILE STATION FROM A PROVISIONING SERVER USING ENCRYPTION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless networks and, more specifically, to a system for performing secure over-the-air (OTA) provisioning or OTA updating of cellular phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with cellular/wireless modems. Because the bandwidth for a current generation mobile station is typically limited to a few tens of kilobits per second (Kbps), the applications for the current generation of mobile stations are relatively limited. However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G cellular modem) may be used to browse web sites on the Internet, to transmit and receive graphics, to execute streaming audio and/or video applications, and the like. In sum, a much higher percentage of the wireless traffic handled by 3G cellular systems will be Internet protocol (IP) traffic and a lesser percentage will be traditional voice traffic.

In order to make wireless services as convenient and as affordable as possible, wireless service providers frequently sell cellular handsets (or other types of mobile stations) directly to potential subscribers from display booths in supermarkets and department stores. Simple instructions are provided to guide the buyer through the process of activating the cellular handset and signing up for wireless services to become a subscriber. In conventional cellular systems, the handset buyer activates the new handset and signs up for service by dialing "*228xx" on the handset keypad in accordance with the handset instructions. The value of "xx" varies according to the identity of the wireless service provider that sells the handset.

Although initially unprovisioned, the new handset must, of necessity, have certain minimum radio frequency (RF) communication capabilities that enable the handset to become provisioned. Dialing "*228xx" on the handset keypad automatically initiates a special purpose call that connects the handset buyer to an operator. The operator requests certain account information from the buyer, such as personal information, a credit card number, home billing address, and the like. When the account information is collected and the account is set up, the operator instructs the handset buyer to enter several sequences of passwords, code numbers, menu-selected commands, and the like, that enable certain functions in the handset.

This process is frequently referred to as "service provisioning." Service provisioning may activate in the cellular handset a Number Assignment Module (NAM), which gives the handset a unique telephone number in order to receive calls and provides a roaming capability by identifying approved wireless carriers. Service provisioning may also activate in the handset a Preferred Roaming List (PRL), which is a list of frequencies/bands owned by each carrier in each geographical region and which may identify preferred and/or prohibited frequencies in each region as well. Service provisioning also activates an authentication code, sometimes referred to as an "A-key," in the cellular handset. The handset uses the A-key to authenticate the handset when the subscriber attempts to access the wireless network.

The wireless network uses a home location register (HLR) to store the A-key, the phone number, the roaming capability information, and other data related to each handset that has been or is being authenticated and provisioned by the wireless network. The HLR is a permanent database used by the wireless service provider to identify/verify a subscriber and store individual subscriber data related to features and services. The subscriber's wireless service provider uses the HLR data when the subscriber is accessing the wireless network in the subscriber's home coverage area. Other wireless service providers also use the HLR data (typically accessed via wireline telephone networks) when the subscriber roams outside the subscriber's home coverage area.

The conventional provisioning process described above has numerous drawbacks. A human operator must talk the user through the process of pressing keys and verifying screen results. This is time consuming and frequently results in errors, particularly with unsophisticated subscribers. Mistakes may go unnoticed initially and the subscriber may become frustrated that the cellular service does not operate as advertised. When the mistake is finally diagnosed, the provisioning process may need to be at least partially re-performed. The human operator adds labor costs to the service provisioning process. These labor costs are increased if the service provisioning process is time consuming, since more operators are needed.

The service provisioning process is further complicated by the fact that wireless service providers frequently make different types of wireless phone handsets available to their subscribers. For example, a wireless service provider, such as AT&T®, may sell SAMSUNG®, NOKIA®, and MOTOROLA® mobile phones to its subscribers. If the graphical user interfaces of the different models are significantly different, a different service provisioning procedures may have to be implemented for each telephone. Additionally, if the wireless service provider installs service provisioning software on cellular handsets before the handsets are distributed to consumers, the wireless service provider must develop customized software for each type of handset, since it is unlikely that all of the different cellular handset models contain the same basic operating system and/or microprocessor.

It would be preferable to automate cellular service provisioning to the greatest extent possible in order to reduce labor costs, eliminate errors, and make the process more user-friendly by minimizing or eliminating subscriber interaction. In particular, it would be more convenient to perform at least part of the over-the-air (OTA) cellular service provisioning process by accessing a provisioning server from an unprovisioned handset via an Internet connection. The 3G systems will make OTA service provisioning of handsets easier and more common.

Therefore, there is a need in the art for improved systems and methods for performing automatic service provisioning of wireless handsets (and other types of mobile stations). In particular, there is a need in the art for systems and methods for performing over-the-air service provisioning of wireless handsets that minimize subscriber interaction. More particularly, there is a need for systems and methods for performing over-the-air service provisioning of wireless handsets without using different service provisioning software in handsets from different manufacturers.

SUMMARY OF THE INVENTION

To address the above-discussed deficiencies of the prior art, it is a primary object of the present invention to provide, for use in a wireless network comprising a plurality of base stations, each of the base stations capable of communicating with a plurality of mobile stations, a service provisioning system capable of provisioning a first one of the plurality of mobile stations. In an advantageous embodiment of the present invention, the service provisioning system comprises: 1) a database capable of storing a service provisioning file comprising a mobile station service provisioning program in interpreted byte-code format; and 2) a provisioning controller coupled to the database capable of receiving a notification indicating that the first mobile station is unprovisioned and further capable, in response to receipt of the notification, of retrieving the service provisioning file from the database and transmitting the service provisioning file to the first mobile station, wherein receipt of the service provisioning file is capable of causing the mobile station to execute the mobile station service provisioning program in the service provisioning file.

In one embodiment of the present invention, the service provisioning file further comprises provisioning data used to configure the first mobile station to communicate with the wireless network.

In another embodiment of the present invention, the service provisioning file further comprises a stale code generated by the provisioning controller, the stale code indicating a time duration since the service provisioning file was transmitted to the first mobile station.

In still another embodiment of the present invention, the first mobile station transmits the stale code back to the provisioning controller and wherein the provisioning controller prevents the first mobile station from being provisioned if the time duration exceeds a predetermined maximum threshold.

In yet another embodiment of the present invention, the service provisioning system further comprises a security apparatus capable of determining that the first mobile station is unprovisioned and, in response to the determination, generating and transmitting the notification to the provisioning controller.

It is also primary object of the present invention to provide a mobile station capable of being provisioned from a wireless network by an over-the-air (OTA) service provisioning process. According to an advantageous embodiment of the present invention, the mobile station comprises 1) an RF transceiver capable of receiving and demodulating forward channel messages from the wireless network and further capable of modulating and transmitting reverse channel messages to the wireless network; and 2) a main controller capable of receiving the demodulated forward channel messages from the RF transceiver and extracting therefrom a service provisioning file containing a mobile station service provisioning program in interpreted byte-code format, wherein the main controller, in response to receipt of the service provisioning file, is capable of interpreting and executing the interpreted byte-code application program.

According to an one embodiment of the present invention, the service provisioning file further comprises provisioning data and wherein the main controller uses the provisioning data to configure the first mobile station to communicate with the wireless network.

According to another embodiment of the present invention, the service provisioning file further comprises a stale code generated by a provisioning controller in the wireless network, the stale code indicating a time duration since the service provisioning file was transmitted to the first mobile station.

According to still another embodiment of the present invention, the main controller transmits the stale code back to the provisioning controller and wherein the provisioning controller prevents the first mobile station from being provisioned if the time duration exceeds a predetermined maximum threshold.

According to yet another embodiment of the present invention, the interpreted byte-code application program comprises a graphical user interface (GUI) program capable of interacting with a user of the first mobile station during the OTA service provisioning process.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
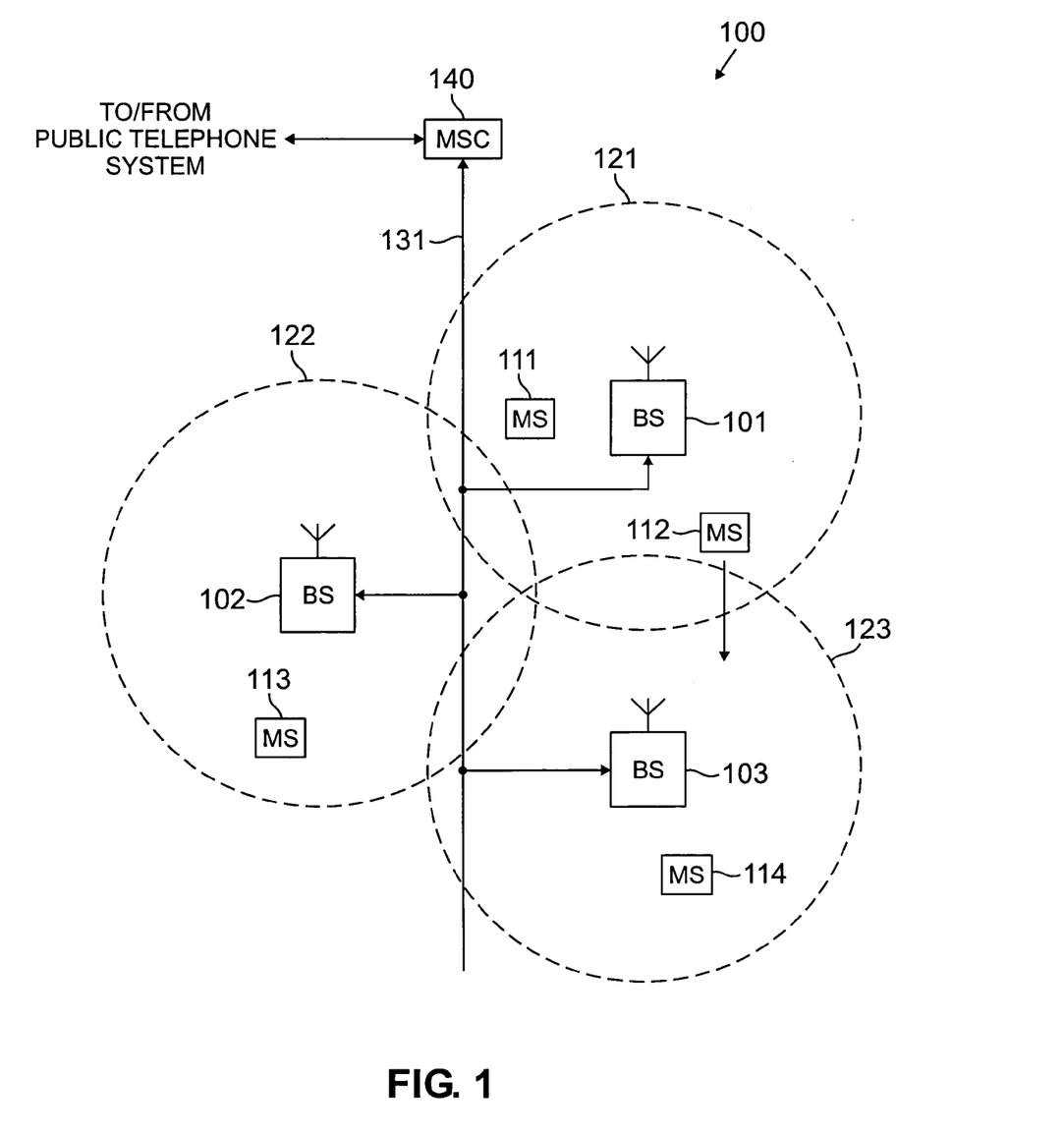
FIG. 1 illustrates a general overview of an exemplary wireless network according to one embodiment of the present invention.

FIG. 1 illustrates a general overview of an exemplary wireless network 100 according to one embodiment of the present invention. Wireless telephone network 100 comprises a plurality of cell sites 121-123, each containing one of the base stations, BS 101, BS 102, or BS 103. Base stations 101-103 are operable to communicate with a plurality of mobile stations (MS) 111-114. Mobile stations 111-114 may be any suitable wireless communication devices, including conventional cellular telephones, PCS handset devices, portable computers, telemetry devices, and the like.

Dotted lines show the approximate boundaries of the cell sites 121-123 in which base stations 101-103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of mobile stations 111-114 may initially be unprovisioned devices. That is, necessary configuration data, such as Number Assignment Module (NAM) data, Preferred Roaming List (PRL) data, or authentication code (or "A-key") data may not be present in, for example, MS 112 or, if present, may not be properly configured or enabled, so that MS 112 is unable to communicate with BS 101. To enable such unprovisioned devices to operate in wireless network 100, an over-the-air (OTA) service provisioning capability is provided in wireless network 100.

Figure 2:
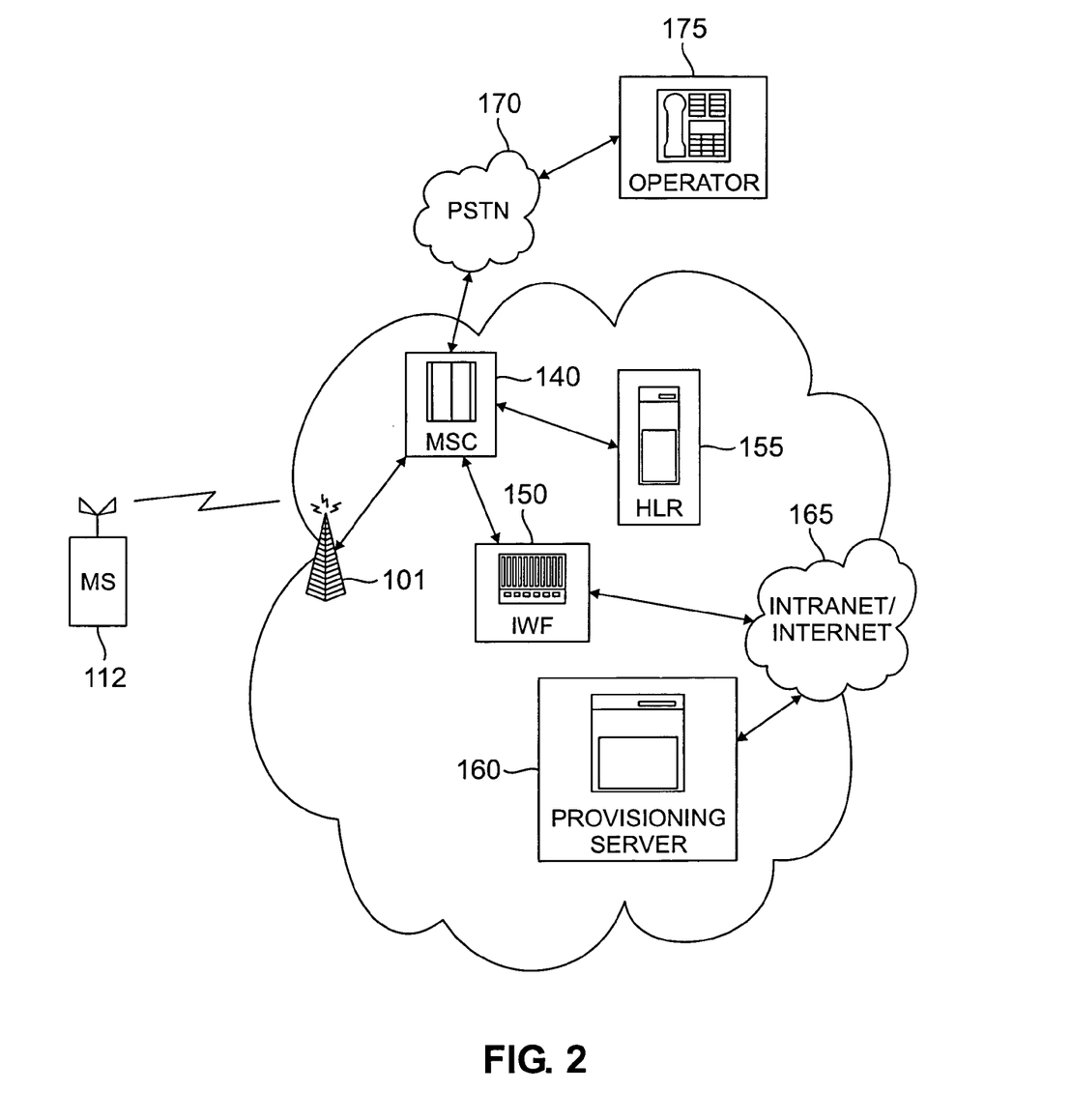
FIG. 2 illustrates an alternate view of selected portions of exemplary wireless network 100 that perform over-the-air (OTA) service provisioning according to one embodiment of the present invention.

FIG. 2 illustrates an alternate view of selected portions of exemplary wireless network 100 that perform over-the-air (OTA) service provisioning according to one embodiment of the present invention. MS 112, BS 101, and MSC 140 are still present, as in FIG. 1. In FIG. 2, wireless network 100 further comprises interworking function (IWF) 150, home location register (HLR) 155, and provisioning server 160. Provisioning server 160 is a system-wide central server that is located remote from the other components of wireless network 100, namely, BS 101, MSC 140, IWF 150, and HLR 155. In order to access a special service provisioning file in provisioning server 160, MSC 140 communicates with provisioning server 160 via intranet/Internet 165 (hereafter "Internet 165"). Since data within wireless network 100 may be communicated in one or more of a wide variety of communication protocols, according to the choices made by the wireless service provider, IWF 150 is needed to translate the "native" communication transport protocol that carries application data in wireless network 100 into Internet protocol (IP) based data packets suitable for transmission in Internet 165.

It should be noted that the scope of the present invention is not limited to wireless networks that use the Internet to link base stations and provisioning servers. In alternate embodiments of the present invention, Internet 165 may actually be a large intranet that links a group of base stations to one or more provisioning servers.

Wireless network 100 allows an unprovisioned handset, such as MS 112, to initiate the service provisioning process in a number of ways, including by a voice call to a human operator and by a "data" call that directly accesses provisioning server 160. In one embodiment of the present invention, MS 112 initiates a voice call (not a data call) through public switched telephone network (PSTN) 170 to operator station 175, which may be either a human operator or an automated voice menu application. The voice call and the provisioning process is initiated when the user of MS 112 dials a predetermined provisioning phone number, such as "*228xx" for example, on the handset keypad in accordance with the handset instructions, where the value of "xx" varies according to the identity of the wireless service provider that sells MS 112. Since MS 112 is unprovisioned and cannot be authenticated, wireless network 100 rejects any dialed number other than "*228xx." Since "*228xx" is used only for provisioning, MS 112 is connected to operator station 175 via BS 101, MSC 140 and PSTN 170.

Once connected to operator station 175, critical information, such as the potential subscriber's credit card information, is gathered from the user of MS 112 by the human operator or voice menu script. Once the critical subscriber information is gathered, operator station 175 sends a provisioning command to the base station communicating with MS 112 (in this case, BS 101) and/or to MSC 140. The critical subscriber information is also sent via MSC 140 to HLR 155 for future use once the provisioning process is complete. The provisioning command causes BS 101 (and/or MSC 140, as the case may be) to establish a session via Internet 165 with provisioning server 160 in order to send the critical subscriber information gathered by operator station 175 to provisioning server 160. Provisioning server 160 then transmits a special service provisioning file (described in detail further below), including an interpreted byte-code application, to MS 112 that completes the service provisioning process, including the transfer of Number Assignment Module (NAM) data, Preferred Roaming List (PRL) data, or authentication code (i.e., A-Key) data to MS 112.

In an advantageous embodiment, the present invention allows the special service provisioning file to be transmitted (i.e., downloaded) to MS 112 by means of a special "data burst" message that occurs in the forward and/or reverse traffic channels that provide communication between MS 112 and BS 101. In such an embodiment, MS 112 only communicates with wireless network 100 via conventional traffic (e.g., voice) channels. Alternatively, the special service provisioning file may be downloaded to MS 112 by means of a Short Messaging Service (SMS) message transmitted from BS 101. BS 101 (and/or MSC 140) acts as an agent for MS 112 and independently establishes and controls the Internet session with provisioning server 160.

Before any communication can occur between MS 112 and the rest of wireless network 100 through BS 101, wireless network 100 must first verify (i.e., authenticate) that MS 112 has been service provisioned by determining whether or not MS 112 has, for example, a proper shared secret data (SSD) code and required provisioning data. The processing system responsible for authenticating MS 112 and determining whether or not MS 112 has been provisioned may be disposed in the base stations or in MSC 140. In a conventional service provisioning process, a subscriber typically enters an A-key into a mobile station during the initial provisioning process. However, other methods may be employed for entering or obtaining the A-key. After the A-key is obtained, the mobile station may automatically generate a shared secret data (SSD) code from the A-key or by another algorithm. In either case, the mobile station transfers its SSD code as part of the authentication process. Once a mobile station is provisioned, each base station in the network will have an SSD code corresponding to the SSD code for the provisioned mobile station.

Mobile communication systems in North America frequently use the Cellular Authentication Verification and Encryption (CAVE) algorithm for authentication purposes. In an advantageous embodiment of the present invention, wireless network 100 utilizes a CAVE algorithm for authentication purposes. MSC 140 begins the authentication process by transferring an authorization (AUTH) bit in an overhead control message over the control channel for cell site 121. When MS 112 recognizes the AUTH bit, MS 112 may automatically transmit identification data on its control channel to BS 101. This MS 112 identification data may include SSD information, electronic serial number (ESN) data, billing information, dialed subscriber number, and other enabling data.

Wireless network 100 stores initial incoming control channel data from MS 112 and compares the received SSD information with SSD information retrieved from HLR 155. If wireless network 100 determines that the received SSD information from MS 112 is valid, then wireless network 100 examines other data stored in HLR 155, such as NAM data and billing information, to determine if MS 112 has been provisioned. If wireless network 100 verifies that MS 112 is properly provisioned, the voice/data call is transferred to MSC 140 for normal call processing. If wireless network 100 determines that MS 112 has not been previously provisioned (i.e., no billing information, no NAM data, etc.), wireless network 100 may automatically transfer the call to operator station 175 via MSC 140 and PSTN 170 in order to begin the provisioning process.

In an alternate embodiment of the present invention, wireless network 100 may determine that a mobile station accessing BS 101 is unprovisioned by other means. For example, if MS 112 cannot even authenticate itself properly, wireless network 100 may simply reject the call or may automatically transfer the call to operator station 175 in order to begin the provisioning process. Alternatively, if MS 112 has dialed a special telephone number (e.g., *228xx) reserved for service provisioning, wireless network 100 may also automatically transfer the call to operator station 175 via MSC 140 and PSTN 170 in order to begin the provisioning process.

After wireless network 100 connects MS 112 to operator station 175, the human operator or an automated voice menu at operator station 175 may instruct the user of MS 112 to begin the provisioning process by orally or manually entering required subscriber data, such as credit card number, address, type of service, and the like. Operator station 175 may transmit the gathered subscriber data to HLR 155 via MSC 140 and to provisioning server 160 via Internet 165.

In an alternate embodiment of the present invention, operator station 175 may be omitted entirely and MS 112 may be connected directly to provisioning server 160 by means of a "data" call if wireless network 100 determines that MS 112 cannot be authenticated or is not provisioned. By data call, it is meant that BS 101 establishes a conventional Internet connection to provisioning server 160 and transmits and receives Internet protocol (IP) data packets via Internet 165. In such an embodiment, provisioning server 160 automatically transfers the special service provisioning file to BS 101 for subsequent transmission to the unprovisioned mobile station (i.e., MS 112).

Figure 3:
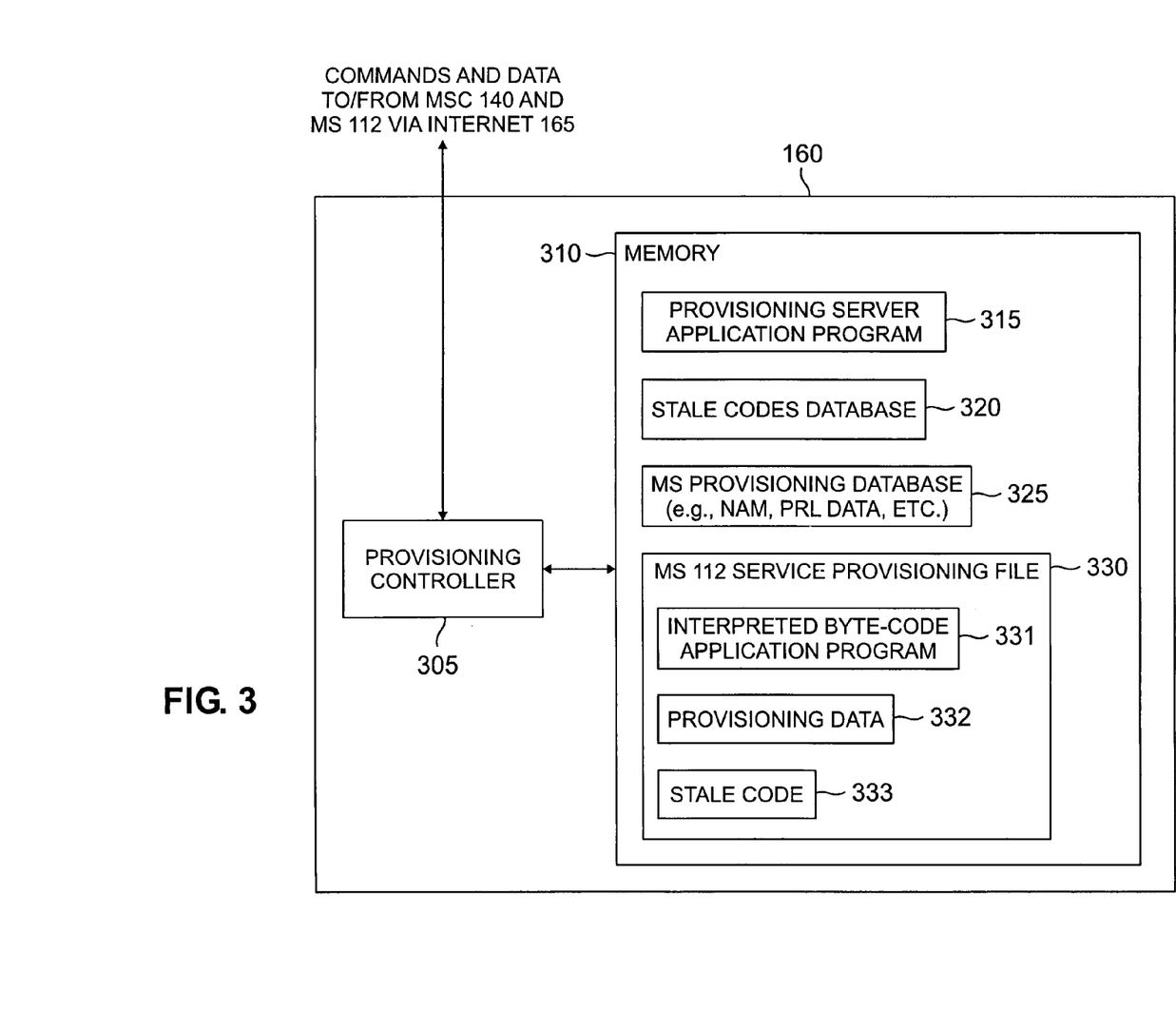
FIG. 3 illustrates exemplary provisioning server 160 according to one embodiment of the present invention.

FIG. 3 illustrates provisioning server 160 according to one embodiment of the present invention. Provisioning server 160 comprises provisioning controller 305 and memory 310. Memory 310 stores application programs and data associated with the operation of provisioning server 160, including provisioning server application program 315, stale codes database 320, mobile station (MS) provisioning database 325, and MS 112 service provisioning file 330. MS 112 service provisioning file 330 comprises interpreted byte-code application program file 331, provisioning data file 332, and stale code field 333.

Provisioning controller 305 operates under the control of provisioning server application program 315 to provide provisioning services for wireless network 100. Provisioning controller 305 creates MS 112 service provisioning file 330 in response to a provisioning request for MS 112. Provisioning controller 305 provides a copy of an interpreted byte-code application program to each mobile station being provisioned, including MS 112. The interpreted byte-code application program is an architecture-neutral (i.e., processor independent) program that may be run on any type of processor used by any handset that includes a byte-code interpreter, such as MS 112. The interpreted byte-code application program may be developed in one of several interpreted byte-code languages including Java, perl, Tcl, Python, and Lisp. Provisioning controller 305 stores a copy of the interpreted byte-code application program for MS 112 in interpreted byte-code application program file 331.

Provisioning controller 305 copies provisioning data for MS 112 from MS provisioning database file 325 into provisioning data file 332. In addition, provisioning controller 305 may provide security for the MS 112 provisioning process by copying a security code from stale codes database 320 into stale code field 333. Provisioning controller 305 transfers the completed MS 112 service provisioning file 330 to wireless network 100 through Internet 165.

During the provisioning process, provisioning controller 305 may compare the security code transmitted back from MS 112 in subsequent provisioning messages to the original security code stored in stale code field 333. If the received security code from MS 112 does not match the original security code stored in stale code field 333, provisioning controller 305 aborts the provisioning process for MS 112. In another embodiment, provisioning controller 305 also may transmit error message to BS 101 or MSC 140 if the received security code and the original security code do not match.

Provisioning controller 305 may generate security codes for stale codes database 320 by any one of several possible algorithms. For instance, provisioning controller 305 may generate a random security code when it receives a provisioning request for a particular mobile station, such as MS 112. In another alternate embodiment, provisioning controller 305 may obtain one or more security codes from an external source located on Internet 165 or in wireless network 110. Regardless of the source, provisioning controller 305 stores resultant security codes in stale codes database 320 for later use.

During normal operation, provisioning controller 305 may examine stale codes database 320 to detect (or identify) one or more security codes which have been active for an extended period of time, which are not presently being used by at least one handset during the provisioning process, or which are identified as being stale codes by some other criteria. Subsequently, provisioning controller 305 deletes the one or more identified stale codes from stale codes database 320. After this action, provisioning controller 305 ignores reverse channel provisioning messages which contain deleted stale codes, which prevents unauthorized use of the service provisioning process.

Figure 4:
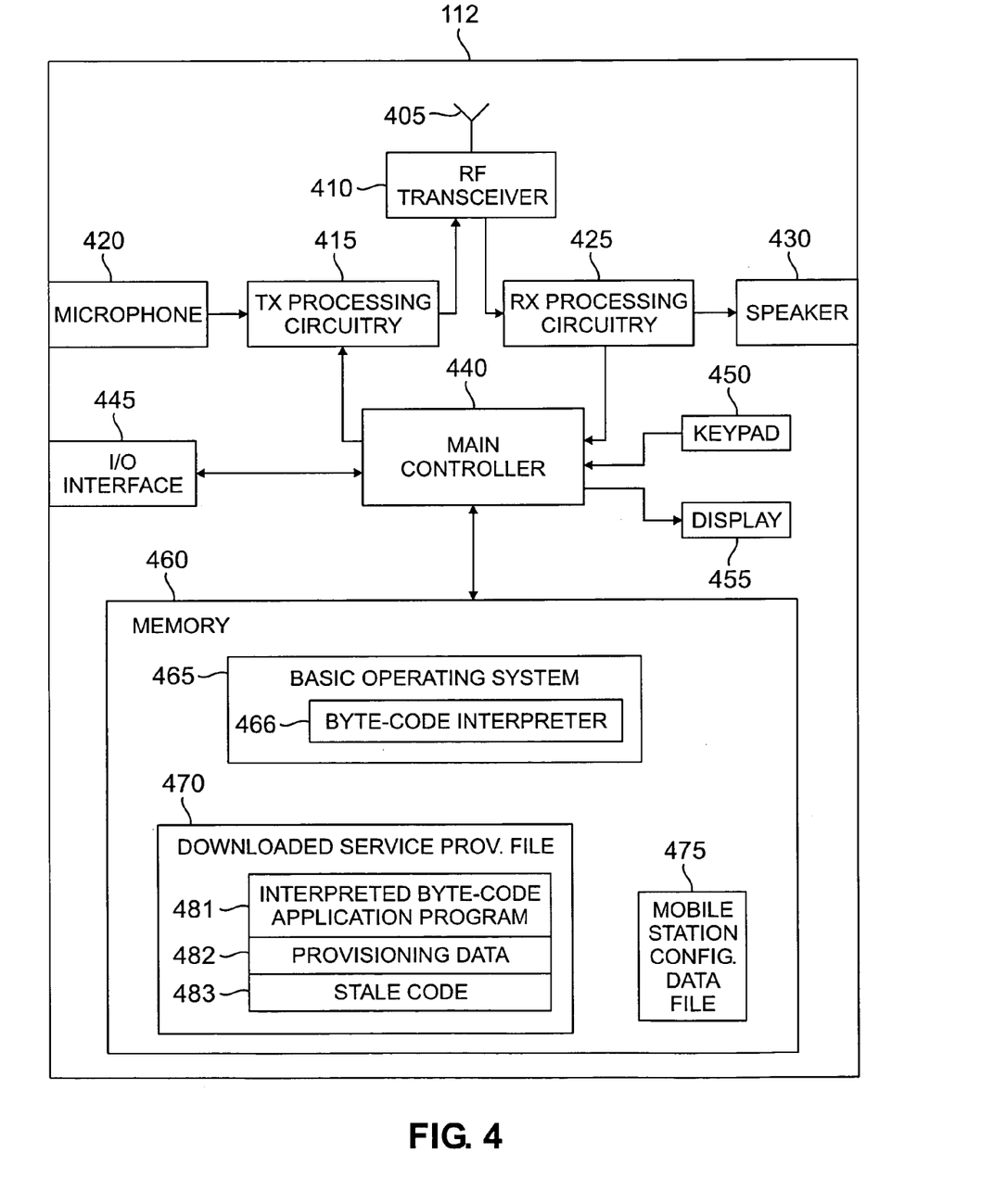
FIG. 4 illustrates exemplary mobile station according to one embodiment of the present invention.

FIG. 4 illustrates exemplary mobile station 112 according to one embodiment of the present invention. Mobile station 112 comprises antenna 405, radio frequency (RF) transceiver 410, transmitter (TX) processing circuitry 415, microphone 420, receiver (RX) processing circuitry 425, and speaker 430. Mobile station 112 further comprises main controller 440, input/output (I/O) interface 445, keypad 450, display 455, and memory 460.

Antenna 405 transfers wireless communication signals between wireless network 100 and RF transceiver 410. RF transceiver 410 receives and demodulates incoming RF signals transmitted by wireless network 100 and transfers the demodulated voice and/or data traffic to RX processing circuitry 425. RF transceiver 410 also modulates and transmits outgoing voice and/or data traffic received from TX processing circuit 415.

TX processing circuitry 415 receives voice signals from microphone 420 and processes the voice signals prior to transmission by RF transceiver 410. TX processing circuitry 415 may also receive and process data, such as keystroke entries from keypad 450 (via main controller 440) for subsequent transmission by RF transceiver 410. RX processing circuitry 425 receives voice traffic from RF transceiver 410 and converts the voice traffic to analog signals that drive speaker 430. RX processing circuitry 425 may also transfer incoming data traffic to main controller 440.

Main controller 440 executes basic operating system program 465 in order to control the operation of TX processing circuitry 415, RX processing circuitry 425, and the other components of mobile station 112. Main controller 440 also processes incoming data from keypad 450, outgoing data for display 455, and data that is loaded from I/O interface 445. I/O interface 445 typically comprises a connector and interface circuits that connect an external data source, such as a computer, to main controller 440. I/O interface 445 allows main controller 440 to upload data and store it in memory 460.

Keypad 450 comprises control and alphanumeric keys that allow a user to select functions, enter data, and dial numbers. The control keys on keypad 450 may be used to sequence through various menus screens that may appear on display 455. Display 455 may display a limited set of alphanumeric characters or may be capable of displaying a wide array of dynamic and/or static graphics. Display 455 is active when the handset is powered on and may normally show the service provider's logo during the time that power is turned on.

Memory 460 stores application programs and data associated with the operation of mobile station 112, including basic operating system program 465, which includes byte-code interpreter 466. Byte-code interpreter 466 converts byte-codes generated by a byte-code language, such as Java, to binary operational codes which may be executed as a program by main controller 440. Memory 460 also stores downloaded service provisioning (prov.) file 470 and mobile station configuration data file 475. Downloaded service provisioning file 470 comprises interpreted byte-code application program 481, provisioning data file 482, and stale code field 483. Interpreted byte-code application program 481 is a service provisioning program that communicates with provisioning server application program 315 and updates mobile station configuration data file 475 using the contents of provisioning data file 482. Main controller 440 uses byte-code interpreter 466 to translate interpreted byte-code application program 481 from byte-code to the native machine language of the processor in MS 112. Provisioning data file 482 contains the same specific service provisioning data for MS 112 (e.g., NAM data, PRL data, AUTH codes, and the like) that is stored in provisioning data file 332.

Prior to provisioning, mobile station configuration data file 475 stores the initial configuration data provided by the manufacturer of MS 112. However, this configuration data does not include the provisioning data needed to make MS 112 fully operational in wireless network 100. During the service provisioning process, main controller 440, under the control of basic operating system 465, stores reverse channel data from provisioning server 160 in downloaded service provisioning file 470. Main controller 440 transmits data and command messages to, and receives data and command messages from, provisioning server 160 until the contents of MS 112 provisioning file 330 have been successfully transferred to downloaded service provisioning file 470.

Main controller 440 then uses byte-code interpreter 466 to execute interpreted byte-code application program 481. Main controller 440 may execute a user-friendly graphical user interface (GUI) provided by interpreted byte-code application program 481. The GUI program guides the subscriber through the provisioning process for MS 112, thereby minimizing or even completely eliminating the need for assistance from a human operator. Main controller 440 stores the correctly formatted provisioning data in mobile station configuration data file 475 for use in processing calls through wireless network 100.

Main controller 440 also processes the stale code in the stale code stored in stale code field 483 according to the established security algorithm. In one embodiment or the present invention, main controller 440 may transmit the stale code back to provisioning server 160 during the service provisioning process. In one embodiment of the present invention, the stale code may be a public key used in a public key-private key encryption system. Main controller 440 may use the stale code to encrypt data and messages transmitted to provisioning server 160. If the stale code is old, provisioning server 160 may abort the service provisioning process. Once MS 112 has been correctly provisioned, main controller 440 may discard the contents of downloaded service provisioning file 470 and activate call processing services for MS 112.

Figure 5:
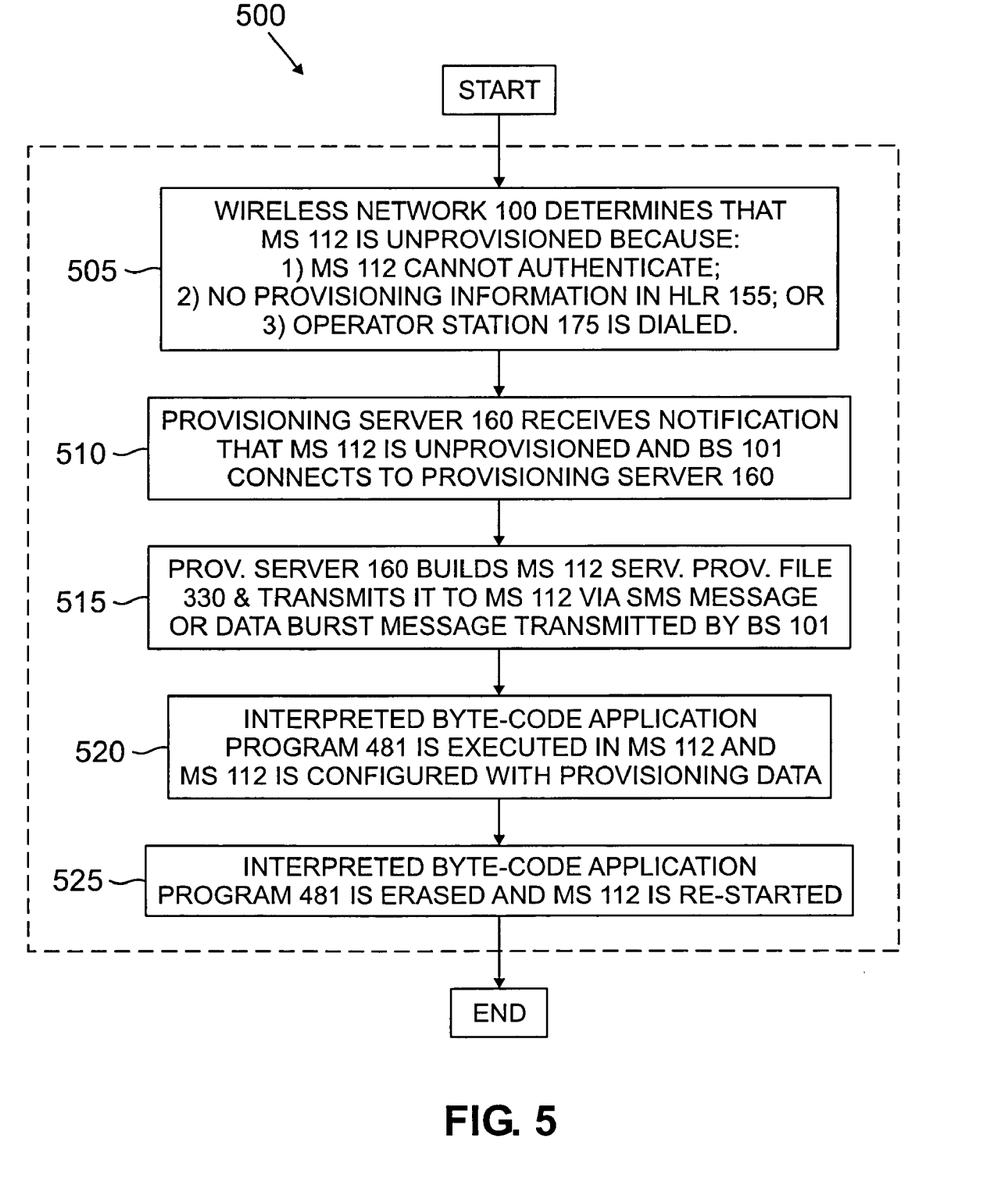
FIG. 5 depicts a flowchart which illustrates the operation of an exemplary provisioning server and exemplary mobile station in the exemplary wireless network according to one embodiment of the present invention.

FIG. 5 depicts flowchart 500, which illustrates the operation of exemplary provisioning server 160 and exemplary MS 112 in wireless network 100 according to one embodiment of the present invention. Under normal operating conditions, wireless network 100 may determine that MS 112 is unprovisioned because 1) MS 112 cannot be authenticated, 2) no provisioning information is available from HLR 155, or 3) MS 112 has dialed operator station 175 (process step 505). As a result, provisioning server 160 receives notification that MS 112 is unprovisioned and BS 101 connects to provisioning server 160 (process step 510).

In response, provisioning server 160 builds MS 112 service provisioning file 330. Provisioning server 160 then transmits the contents of MS 112 service provisioning file 330 to MS 112 via a Short Messaging Service (SMS) message or by a traffic channel data burst message transmitted by BS 101 (process step 515).

Next, MS 112 receives the contents of MS 112 service provisioning file 330 and stores it in downloaded service provision file 470. Under the control of byte-code interpreter 466, main controller 440 executes interpreted byte-code application program 481 for data conversion and completion of the provisioning and configuration process (process step 520). When the provisioning process is complete, main controller 440 erases interpreted byte-code application program 481 and re-starts MS 112 as a provisioned handset in wireless network 100 (process step 525).

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations, each of said base stations capable of communicating with a plurality of mobile stations, a service provisioning system capable of provisioning a first one of said plurality of mobile stations comprising:

a database capable of storing a service provisioning file comprising a mobile station service provisioning program in interpreted byte-code format; and a provisioning controller coupled to said database capable of receiving a notification indicating that said first mobile station is unprovisioned and further capable, in response to receipt of said notification, of retrieving said service provisioning file from said database and transmitting said service provisioning file to said first mobile station, wherein receipt of said service provisioning file causes said first mobile station to automatically execute said mobile station service provisioning program in said service provisioning file, execution of said mobile station service provisioning program automatically provisioning said first mobile station without further interaction from a service operator.

2. The service provisioning system as set forth in claim 1 wherein said service provisioning file further comprises provisioning data used to configure said first mobile station to communicate with said wireless network.

3. The service provisioning system as set forth in claim 1 wherein said service provisioning file further comprises a stale code generated by said provisioning controller, said stale code indicating a time duration since said service provisioning file was transmitted to said first mobile station.

4. The service provisioning system as set forth in claim 3 wherein said first mobile station transmits said stale code back to said provisioning controller and wherein said provisioning controller prevents said first mobile station from being provisioned if said time duration exceeds a predetermined maximum threshold.

5. The service provisioning system as set forth in claim 1 further comprising a security apparatus capable of determining that said first mobile station is unprovisioned and, in response to said determination, generating and transmitting said notification to said provisioning controller.

6. A mobile station capable of being provisioned from a wireless network by an over-the-air (OTA) service provisioning process, said mobile station comprising:

an RF transceiver capable of receiving and demodulating forward channel messages from said wireless network and further capable of modulating and transmitting reverse channel messages to said wireless network; and a main controller capable of receiving said demodulated forward channel messages from said RF transceiver and extracting therefrom a service provisioning file containing a mobile station service provisioning program in interpreted byte-code format, wherein said main controller, in response to receipt of said service provisioning file, is capable of interpreting and executing said mobile station service provisioning program, execution of said mobile station service provisioning program automatically provisioning said mobile station without further interaction from a service operator.

7. The mobile station as set forth in claim 6 wherein said service provisioning file further comprises provisioning data and wherein said main controller uses said provisioning data to configure said mobile station to communicate with said wireless network.

8. The mobile station as set forth in claim 6 wherein said service provisioning file further comprises a stale code generated by a provisioning controller in said wireless network, said stale code indicating a time duration since said service provisioning file was transmitted to said mobile station.

9. The mobile station as set forth in claim 8 wherein said main controller transmits said stale code back to said provisioning controller and wherein said provisioning controller prevents said mobile station from being provisioned if said time duration exceeds a predetermined maximum threshold.

10. The mobile station as set forth in claim 6 wherein said mobile station service provisioning program comprises a graphical user interface (GUI) program capable of interacting with a user of said mobile station during said OTA service provisioning process.

11. For use in a wireless network comprising a plurality of base stations, each of the base stations capable of communicating with a plurality of mobile stations, a method of provisioning a first one of the plurality of mobile stations comprising the steps of:

storing in a database a service provisioning file comprising a mobile station service provisioning program in interpreted byte-code format;

determining whether the first mobile station is provisioned;

in response to a determination that the mobile station is unprovisioned, retrieving the service provisioning file from the database; and transmitting the service provisioning file to the first mobile station, wherein receipt of the service provisioning file causes the first mobile station to automatically execute the mobile station service provisioning program in the service provisioning file, execution of the mobile station service provisioning program automatically provisioning the first mobile station without further interaction from a service operator.

12. The method as set forth in claim 11 wherein the service provisioning file further comprises provisioning data used to configure the first mobile station to communicate with the wireless network.

13. The method as set forth in claim 11 further comprising the steps of generating a stale code and transmitting the stale code to the first mobile station, the stale code indicating a time at which the service provisioning file was transmitted to the first mobile station.

14. The method as set forth in claim 13 further comprising the steps of receiving from the first mobile station a copy of the stale code transmitted back to the wireless network and determining a time duration since the service provisioning file was transmitted to the first mobile station.

15. The method as set forth in claim 14 further comprising the steps of determining if the time duration exceeds a predetermined maximum threshold and preventing the first mobile station from being provisioned if the time duration exceeds the predetermined maximum threshold.

16. For use in a mobile station capable of communicating with a wireless network, a method of performing an over-the-air (OTA) service provisioning of the mobile station from the wireless network comprising the steps of:

receiving and demodulating forward channel messages from the wireless network;

extracting from the demodulated forward channel messages a service provisioning file containing a mobile station service provisioning program in interpreted byte-code format; and interpreting and executing the mobile station service provisioning program, wherein execution of the mobile station service provisioning program automatically provisions the mobile station without further interaction from a service operator, wherein the mobile station service provisioning program comprises a graphical user interface (GUI) program capable of interacting with a user of the mobile station during the OTA service provisioning process.

17. The method as set forth in claim 16 wherein the service provisioning file further comprises provisioning data used to configure the mobile station to communicate with the wireless network.

18. The method as sot forth in claim 17 wherein the service provisioning file further comprises a stale code generated by the wireless network, the stale code indicating a time at which the service provisioning file was transmitted to the mobile station.

19. The method as set forth in claim 18 further comprising the step of transmitting the stale code back to the wireless network.

20. The method as set forth in claim 16 further comprising the step of deleting the service provisioning file from a memory of the mobile station at an end of the service provisioning process.

* * * * *